Aug. 23, 1938.　　　　T. B. PRICKETT　　　　2,127,529
CONVERTER HAVING HEAT EXCHANGE MEMBERS OR WELLS FOR RECORDING ELEMENTS
Filed Dec. 31, 1935
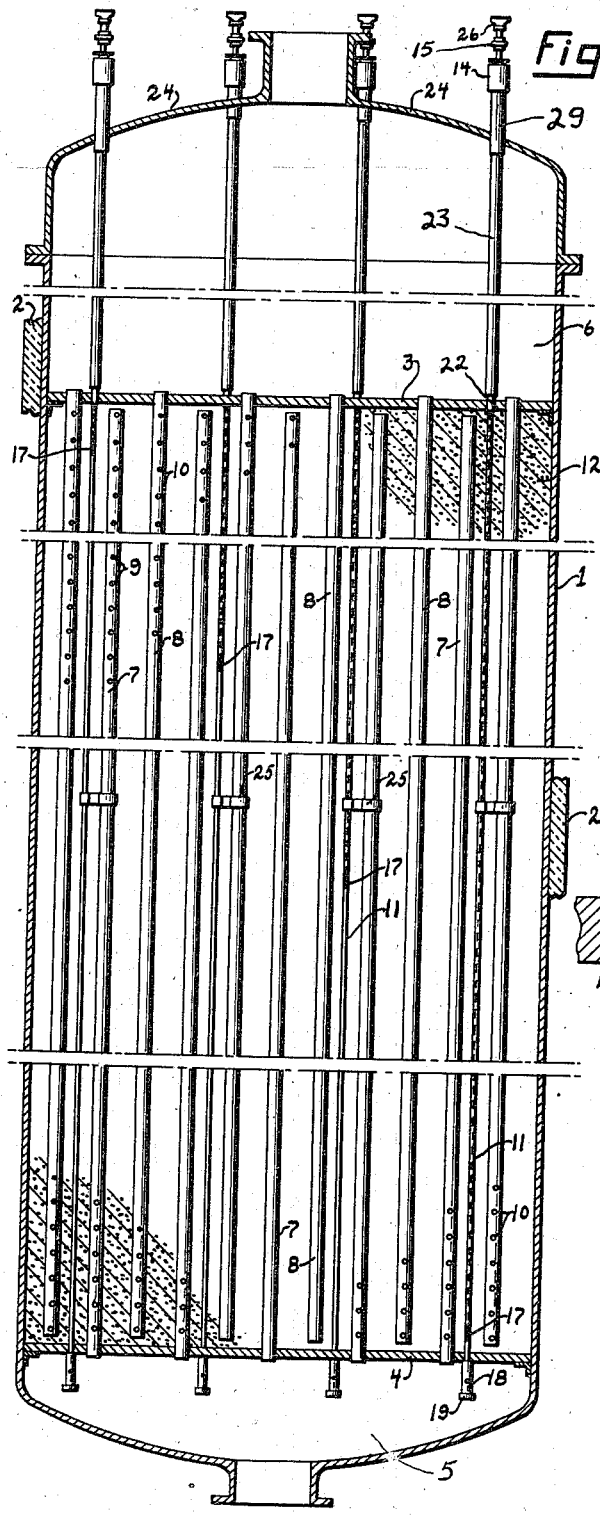
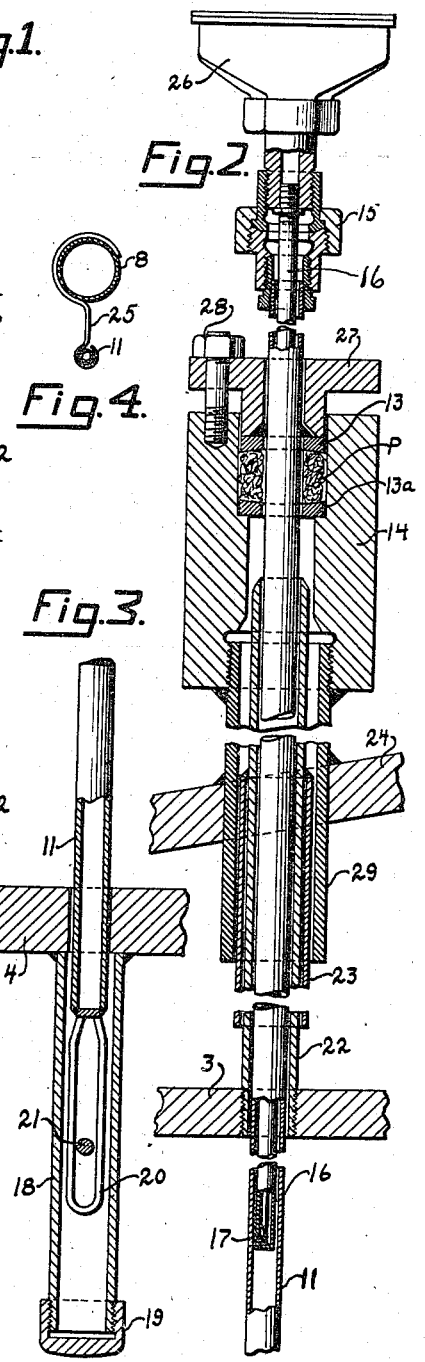
INVENTOR
THOMAS B. PRICKETT
BY
Ira L. Nickerson
ATTORNEY Patented Aug. 23, 1938

2,127,529

UNITED STATES PATENT OFFICE 2,127,529

CONVERTER HAVING HEAT EXCHANGE MEMBERS OR WELLS FOR RECORDING ELEMENTS

Thomas B. Prickett, Woodbury, N. J., assignor to Houdry Process Corporation, Dover, Del., a corporation of Delaware Application December 31, 1935, Serial No. 56,964

8 Claims. (Cl. 23—288)

The present invention relates to the art of effecting chemical reactions or treating fluids and to apparatus therefor. The invention has application to many types of apparatus including heat exchangers, converters and converter structures, providing reaction chambers, whether or not they contain contact masses of a catalytic or non-catalytic nature, and has special utility in the provision of apparatus which facilitates the determination and control of temperatures therewithin and may obviously serve other desired purposes.

It is an object of this invention to provide an enclosed, elongated cylindrical chamber, extending throughout the whole or a part of the reaction chamber of a converter, or equivalent structure. It is a further object to provide structure whereby this elongated chamber will not become bowed or warped due to fluctuations in temperatures or of operating conditions of the apparatus, but will remain straight, thereby readily to permit the introduction into such confined, elongated chamber or withdrawal therefrom of a thermocouple, or other insert. Another object includes structure for stiffening or supporting the walls of the elongated chamber outside of or above a reaction chamber which may or may not contain a bed of contact material. For some adaptations, the stiffening structure may serve the function of heat baffles. Still another object is to keep the structure which forms the elongated chamber anchored in place but yet leaving it some flexibility of movement to accommodate expansions or contractions as, for example, are caused by changes or fluctuations in the temperature of the apparatus during the course of operation.

The invention will be discussed primarily in relation to the mounting of thermocouples, for the sake of a specific adaptation and not by way of limitation. This discussion will be illustrative of the broad utility of the invention.

The above described as well as other objects and advantages, together with a quick understanding of the invention, can be had by reference to the illustrative embodiment thereof, shown in the accompanying drawing, in which:

Fig. 1 is a sectional elevation of a converter, with portions broken out, showing an exemplary arrangement of thermocouple mountings;

Fig. 2 shows, in detail, the upper portion of one thermocouple and mounting, passing through the head of the converter and the upper tube sheet;

Fig. 3 shows, in detail, the bottom of the same thermocouple mounting, passing through the lower tube sheet; and Fig. 4 shows a support adapted to guide the mounting in spaced relation to a tube or conduit and maintain it in place.

Referring more in detail to the drawing, in the several figures of which like reference characters denote similar parts, 1 is a converter surrounded by insulation 2 and having a reaction chamber formed therewithin between upper tube sheet 3 and lower tube sheet 4. Lower manifolding chamber 5 is provided below the lower tube sheet and upper manifolding chamber 6 above the upper tube sheet. Conduits 7 are mounted on the lower tube sheet and communicate therethrough with the manifolding chamber 5; while conduits 8 are shown mounted in the upper tube sheet and communicate with manifolding chamber 6. Conduits 7 have openings or perforations 9 therein and conduits 8 have similar openings or perforations 10. For purposes of illustration, manifolding chamber 5 may be considered as an inlet manifold and conduits 7 as inlet conduits, while chamber 6 may be considered as an outlet manifolding chamber and conduits 8 as outlet conduits; although the reverse is equally feasible. Mountings or tubes 11 extend throughout the reaction chamber 8, through the tube sheets 3 and 4, and above the former through the top head 24 of the converter and above the latter, as indicated. A contact mass 12 fills the reaction chamber surrounding conduits 7 and 8 and the enclosed, fluid tight, elongated, cylindrical chambers or mountings 11.

Each tube 11 is fastened, as by welding, to a washer 13 which is located within a sealing block or anchor block 14, as is most clearly shown in Fig. 2. The tube 11 terminates, as shown, at the union 15, which later serves as a point for disconnecting the terminal block or thermocouple head 26 from the mounting 11 when desired, as for example, happens when it is necessary to withdraw or replace the inner closed duct or thermocouple well 16 which contains the thermocouple wires which are joined together at their ends to form the hot point or thermocouple junction 17. In the several ducts 11 the various hot junctions 17 may be at varying distances from the top tube sheet 3 of the converter.

Tube 11 extends through the bottom tube sheet 4 into the tubular member 18, the lower end of which is closed by a removable cap 19. The tube 11 terminates in a loop 20 providing an elongated slot through which anchor pin 21 extends, the latter being removably secured in the walls of tubular member 18. In the course of operation of such a converter structure, where the mass is heated up and cooled down and the temperatures of the members 11 and conduits 7 and 8 fluctuate above and/or below the temperature of the surrounding contact mass and of the converter structure, it has been found that there is a tendency for the members 11 to creep up. After this happens and a subsequent expansion of members 11 takes place, there is a tendency for such members to bow or warp rather than to slide downwardly through the contact mass which is packed therearound. The present structure permits only a limited movement of the member in either direction, such movements being restricted by contact of the pin 21 with the ends of loop 20. While the distance between the pin and the ends of the slot of member 20 may appear great in the drawing, it is to be understood that converter structures of the type shown are often of the order of 30 feet high so that the space shown is only about sufficient to take care properly of the expansions and contractions of the members 11 when approximately 30 feet long. A stiffening member 22 threadedly engages top tube sheet 3 and surrounds each member 11 and extends upwardly, terminating in anchor block 14. Members 22 are not welded or otherwise joined to members 11. An outer stiffening member 23 surrounds each member 22 in slightly spaced relation therewith and is joined to the latter, as by welding, adjacent the upper edge of the head 24 of the converter and extends downwardly to a point approaching but spaced from the upper tube sheet 3.

A second washer 13a is located in spaced relation with washer 13 within each anchor block 14 and between the washers surrounding each member 11 is a suitable packing member P, such for example, as asbestos, soft metal alloys, etc. This packing eliminates or at least retards leakage from the reaction chamber between the member 11 and the surrounding stiffener 22, which is concentric with and spaced from the former.

Guide members 25, as shown in Figs. 1 and 4, may be considered as anchored to certain of conduits 7 and 8 and as surrounding adjacent member 11. A clearance, for example about 1/8 of an inch, is provided between the outer circumference of member 11 and the inner circumference of the surrounding loop. As many guide members as desired may be located along the length of the members 11, depending upon the height of the converter, although only one is shown in the drawing for each member 11.

When it is desired to remove a thermocouple or other insert from the converter, whether during a period of reaction, regeneration, or when the converter is idle, it is merely necessary to disconnect the union 15 and remove the terminal block 26. Then the thermocouple well 16, together with the enclosed thermocouple wires which are insulated from each other throughout their length and terminate in hot junction 17, may be readily withdrawn. Also it will be seen that various thermocouples may be inserted within member 11 so as to have the hot junction located at any desired distance from the tube sheet 3 when the thermocouple apparatus is assembled.

The weight of the thermocouple head 26 is transmitted to the anchor block 14 through member 11, washer 13, which is welded to such member, and washer 13a. The weight of the anchor block is in turn transmitted to the head 24 of the converter through tubular member 29 which threadedly engages the anchor block 14 and is welded to the head of the converter at the top surface of the latter. The member 29 extends through head 24 and may serve to some extent to further stiffen the structure within which the thermocouple is to be removably inserted.

Various modifications and uses of the structure shown are within the scope of my invention. For example, a stiffening member which extends only between the top tube sheet and the head of the converter, and which may or may not be joined to the top tube sheet, is contemplated in place of stiffening member 22 or members 22 and 23. Again, the anchor block 14 may be omitted and the tubular member 11 may be joined to the upper head 24 of the converter, with the stiffening member or members extending therebelow. The above will exemplify the various modifications which are comprehended within the scope of this invention.

While the invention has special application to the mounting of thermocouples so that the same may be removed and inserted at will, and other advantages are provided, yet it is to be understood, as above pointed out, that the structure may be employed for other purposes. For example, such structure may be employed to contain removable electric heating elements. Again, it may be employed for the circulation of a temperature controlled fluid. The fluid could enter through a duct such as tube 16 and escape through the concentric passage between tube 16 and member 11. This statement of additional uses is only illustrative and, in the appended claims, it is meant to cover the invention broadly for all uses which it is adapted to serve.

What I claim is:

1. In a converter structure providing a reaction chamber containing a contact mass, the combination therewith of a substantially fluid-tight tube passing in substantially upright position throughout the length or height of the chamber and embedded in said mass and extending freely through both end walls thereof, said tube being anchored at one end thereof, outside of said chamber in such manner as to permit limited movement to accommodate expansions and contractions of the tube occasioned by changes in temperature, a sealing block receiving the other end of said tube, at least one stiffening member around said tube and unattached thereto between said sealing block and the nearer end wall of said chamber, said stiffening member being attached at one point to a portion of said converter structure and held in place thereby, and tubular means outside of said stiffening member joining said sealing block to the adjacent wall of the converter structure and adapted to support the said sealing block and prevent fluid leakage from the said chamber.

2. In fluid treating apparatus involving a converter providing a reaction chamber, the combination therewith of a substantially fluid-tight tube passing throughout the length or height of the reaction chamber and extending freely through both ends thereof, a contact mass within said chamber and around said tube counteracting lateral movement thereof, one end of said tube being received by a sealing block, at least one stiffening member surrounding said tube and unattached thereto and extending substantially from the end of said reaction chamber to said sealing block, said stiffening member being attached at one point to a portion of said treating apparatus and held in place thereby, means joining said sealing block to the end of said chamber and adapted to prevent fluid leakage from said chamber around said tube at the end of the chamber last-mentioned, a cap over the other end of said tube, exterior to said chamber and so joined to the end thereof as to prevent fluid leakage from said chamber around said tube, and means within said cap adapted to anchor said tube to permit limited movement to accommodate expansions and contractions of the tube occasioned by fluctuations in temperature and to prevent the tube from creeping up, as tends to occur with repeated cycles of expansion and contraction.

3. In apparatus providing a chamber, the combination therewith of a tube passing throughout the length or height of the chamber and having one end which extends beyond one end of said chamber, said one end of said tube being sealed with relation to but not fixed to the said one end of said chamber through which it passes and being maintained approximately fixed at a point outside said chamber, and the other end of said tube being held in place adjacent the other end of said chamber by means providing limited movement sufficient to permit expansions and contractions occasioned by fluctuations in temperature, the last-mentioned means being mounted adjacent the corresponding end of said chamber and said tube being adapted to removably receive an insert, and a tubular insert which encloses a thermocouple extending within said tube.

4. In a fluid treating apparatus involving a converter providing a reaction chamber, manifolding chambers adjacent either end of said reaction chamber and separated from the latter by partition members, and a contact mass within said chamber, the combination therewith of a substantially fluid-tight tube passing throughout the length or height of said reaction chamber and extending freely through said partition members at both ends thereof and through and beyond the manifolding chamber at one end thereof, a cap over the other end of said tube adjacent the opposite end of said reaction chamber, said cap protruding within the other manifolding chamber and being rigidly fastened to the adjacent partition member in substantially fluid-tight relation therewith, the last-mentioned end of said tube being anchored by means within said cap adapted to anchor said tube in such manner as to permit limited movement of the same.

5. In a fluid treating apparatus involving a converter providing a reaction chamber, manifolding chambers adjacent either end of said reaction chamber and separated from the latter by tube sheets, and a contact mass within said chamber, the combination therewith of a substantially fluid-tight tube passing throughout the length or height of said reaction chamber and extending freely through the tube sheets at both ends thereof and through and beyond the manifolding chamber at one end thereof, a stiffening member, surrounding but unattached to said tube, extending from a point adjacent the tube sheet through said last-mentioned manifolding chamber to a point thereabove or beyond, said stiffening member being attached at one point to a portion of said fluid treating apparatus and held in place thereby, a cap over the other end of said tube, protruding within the other manifolding chamber and rigidly fastened to the adjacent tube sheet in substantially fluid-tight relation therewith, the last-mentioned end of said tube being anchored by means within said cap adapted to anchor said tube in such manner as to permit limited movement thereof to accommodate expansions or contractions occasioned by fluctuations of temperature within the said reaction chamber.

6. In a converter for effecting chemical reactions, a pair of partitions within the converter arranged in substantial parallelism and spaced from each other and from the ends of the converter, dividing the interior thereof into a central chamber containing a contact mass and end inlet and outlet fluid manifolding chambers, a conduit member fixedly attached to one end of said converter, traversing the adjacent manifolding chamber, passing through the adjacent partition so as to be free to expand or contract therethrough, traversing said central chamber, and slidably passing through the other partition to terminate within said other manifolding chamber, means mounted on said other partition for receiving the end of said conduit and restricting the longitudinal movement thereof within limits, and tubular means for stiffening said conduit along its length within the manifolding chamber adjacent the end of the converter to which the conduit is affixed, said means slidably receiving but unattached to said conduit and being mounted on said adjacent partition.

7. In apparatus for treating fluids having a casing providing a reaction chamber for containing a contact mass or catalyst and a manifolding chamber between one end of said reaction chamber and an end or head of said casing, which latter has an opening therethrough, the combination therewith of a tubular member extending through the said opening in said head, through the adjacent manifolding chamber and into and through at least a substantial proportion of the length or depth of said reaction chamber to terminate at a point adjacent the end of said reaction chamber remote from the aforesaid manifolding chamber, said tubular member extending outside of said casing beyond said head, means engaging the exterior of said member to provide a sealed joint but not rigidly joining said member to the head of the casing through which it passes, and means within said casing for guiding and loosely anchoring the other end of said tubular member comprising fixed structure permitting limited longitudinal movement of said tubular member sufficient to allow expansions and contractions thereof occasioned by fluctuations in temperature, said tubular member being adapted to removably receive an insert, and an elongate element passing through the end of said tubular member which is outside of said casing and extending within said tubular member so as to pass through said manifolding chamber and at least a portion of said reaction chamber, one end of said elongate element terminating outside of and beyond the last-mentioned end of said tubular member.

8. In a fluid treating apparatus involving an upright converter providing a reaction chamber, manifolding chambers adjacent the top and bottom of said reaction chamber and separated from the latter by tube sheets, and a contact mass within said chamber, the combination therewith of a substantially fluid-tight tube passing throughout the length or height of the chamber and extending through the tube sheets at both ends thereof and through and above the upper manifolding chamber, a sealing block receiving the upper end of said tube, a tubular stiffening member surrounding said tube and unattached thereto, said stiffening member being joined to the upper tube sheet and extending therefrom through the upper head of the converter and terminating in the said sealing block, a second stiffening member surrounding the first-mentioned stiffening member and attached thereto at at least one point, said second stiffening member extending along said first-mentioned member adjacent to and below the said upper head of the converter and being slightly spaced from the first-mentioned member throughout most of its length, a supporting member joining said sealing block to the said upper head of the converter and surrounding the said tube and said first-mentioned stiffening member, said supporting member forming a fluid-tight junction both with said upper head of the converter and with said sealing block to prevent fluid leakage from the aforesaid reaction chamber, a cap over the lower end of said tube within the lower manifolding chamber and attached in substantially fluid-tight relation with the lower tube sheet, and means within said cap adapted to anchor said tube to permit limited movement thereof to accommodate expansions or contractions occasioned by fluctuations of temperature within the said reaction chamber but to prevent the tube from creeping up beyond a predetermined point.

THOMAS B. PRICKETT.